2,838,441
Patented June 10, 1958

2,838,441

1,1-DI-(p-CHLOROPHENYL) - 2 - (2-PIPERIDYL)- ETHYLENE AND THERAPEUTIC COMPOSI- TIONS CONTAINING SAID COMPOUNDS

Robert E. Allen, Wyoming, and Frank P. Palopoli and Charles H. Tilford, Cincinnati, Ohio, and Marcus G. Van Campen, Jr., Berkeley, Calif., assignors to The Wm. S. Merrell Company, Cincinnati, Ohio, a corporation of Delaware No Drawing. Application May 10, 1957
Serial No. 658,254

2 Claims. (Cl. 167—65)

Our invention relates to the novel chemical compound 1,1-di-(p-chlorophenyl)-2-(2-piperidyl)-ethylene.

The novel compound has the formula

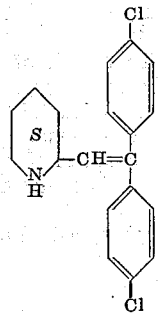

in which S signifies that the ring is saturated.

The compound can be prepared as the free base or as an acid addition salt. The compound can be prepared by the dehydration of the corresponding piperidine ethanol or from the corresponding pyridine ethanol by first hydrogenating the pyridine ring and then dehydrating. The dehydration step can be accomplished by any conventional dehydrating agent such as phosphoric acid (85%), alcoholic hydrogen chloride or toluene sulfonic acid. The hydrogenation of the pyridine ring of the intermediate is accomplished by standard hydrogenation procedures.

The preparation of the new compound will be illustrated by the following example.

EXAMPLE I

*1,1-bis-(p-chlorophenyl)-2-(2-pyridyl)ethanol*

An ethereal solution of 64 grams of bromobenzene was added slowly to a suspension of 6.4 grams of lithium chips in 300 ml. of dry ether. After all the lithium had reacted 40 grams of α-picoline was added and the solution stirred for one hour. To this solution was then added, in one hour, 97 grams of 4,4′-dichlorobenzophenone in 200 ml. of benzene. The reaction mixture was stirred an additional two hours then decomposed with a saturated ammonium chloride solution. The ether layer was dried over magnesium sulfate and the ether removed under reduced pressure. The product crystallized from petroleum ether as a white solid, M. P. 135–138° C., and was 1,1-bis-(p-chlorophenyl)-2-(2-pyridyl)-ethanol.

The hydrochloride salt thereof formed by the addition of hydrochloric acid to the above base melted at 219–220°.

*Analysis.*—Calcd. for $C_{19}H_{15}NOCl_2 \cdot HCl$: Calcd., C, 59.80; H, 4.24; N, 3.68. Found, C, 59.95; H, 4.39; N, 3.82.

*1,1-bis-(p-chlorophenyl)-2-(2-piperidyl)ethanol·HCl*

An alcohol solution containing 12.6 grams of the hydrochloride salt of 1,1-bis-(p-chlorophenyl)-2-(2-pyridyl)ethanol was hydrogenated in the presence of platinum oxide at about 60 lbs. of hydrogen pressure. The catalyst was separated and the alcohol removed under reduced pressure. The product crystallized from ethylacetate as a white solid, M. P. 224–225.5° C. and was the hydrochloride salt of 1,1-bis-(p-chlorophenyl)-2-(2-piperidyl)ethanol. Yield 11.2 grams or 88%.

*Analysis.*—Calcd. for $C_{19}H_{21}NOCl_2 \cdot HCl$: Calcd., C, 59.00; H, 5.73; N, 3.62. Found, C, 58.73; H, 5.60; N, 3.69.

*1,1-bis-(p-chlorophenyl)-2-(2-piperidyl)ethylene·HCl*

Seven grams of 1,1-bis-(p-chlorophenyl)-2-(2-piperidyl)ethanol·HCl was dehydrated with alcoholic HCl at steam bath temperature. The desired product crystallized from a mixture of chloroform and ethylacetate as a white solid, M. P. 257–259°, and was 1,1-bis-(p-chlorophenyl)-2-(2-piperidyl)ethylene·HCl.

*Analysis.*—Calcd, for $C_{19}H_{19}NCl_2 \cdot HCl$: Calcd., C, 61.90; H, 5.47; N, 3.80. Found, C, 62.03; H, 5.51; N, 3.90.

The free base, 1,1-bis-(p-chlorophenyl)-2-(2-piperidyl)-ethylene, was prepared by neutralization of the hydrochloride salt with sodium hydroxide solution and crystallized as a white solid, M. P. 93–97° C., from petroleum ether.

*Analysis.*—Calcd. for $C_{19}H_{19}NCl_2$: Calcd., C, 68.68; H, 5.76. Found, C, 68.79; H, 5.87.

*1,1-bis-(p-chlorophenyl)-2-(2-piperidyl)-ethylene acetate*

To 1 gram of 1,1-bis-(p-chlorophenyl)-2-(2-piperidyl)-ethylene in ether was added an equivalent amount of acetic acid. The solvent is removed on the steam bath and the residue taken up in petroleum ether (B. P. 40–60° C.) from which it crystallized as a white solid M. P. 145–7° C.

A 1:5 aqueous solution of the acetate salt was prepared by heating a gram of the free base in 4 ml. of water on the steam bath and adding about 0.3 ml. (60% excess) of glacial acetic acid.

The new compound possesses anti-inflammatory activity, particularly anti-allergy or anti-hypersensitivity activity and is useful in the treatment of inflammatory diseases, allergies, psoriasis, sensitivity reactions, dysmenorrhea and mental disorders and hypertension believed associated with serotonin. The compound also is useful in the treatment of rheumatism, e. g., rheumatoid arthritis, collagen diseases and similar conditions.

Our new compound is suitable for either oral or parenteral administration, although some local irritation may be encountered with parenteral administration. The compound can be used in oral dosages within the range of about 25 mg. to about 2 grams daily. Parenterally, dosages within the range of about 25 mg. to about 500 mg. can be used. For topical use, the compound can be incorporated into creams, ointments, or lotions in concentrations of up to about 10 percent. The compound can be administered in the form of salts, e. g. the hydrochloride, acetate, glycolate or oleate, or in the form of the free base in oil solution or as a suspension. For example, the compound can be advantageously administered in the form of the oleate salt, or as the base in oleic acid solution although fatty acid-oil mixtures can also be used with advantage as solvents or carriers for the new compound.

The following examples illustrate suitable pharmaceutical compositions containing the new compound. In these examples, the quantities are given for single units, it being understood that in actual practice, the dosage forms will be prepared in suitable quantities, and the amounts of materials used adjusted accordingly.

EXAMPLE II

*25 mg. tablets.*—25 mg. of the hydrochloride of the new compound, 48 mg. of powdered sugar, and 32 mg. of corn starch are mixed and granulated with 10% gelatin solution. The granulation is dried and ground to fine granules for tableting. About 1% magnesium stearate is added as a lubricant together with sufficient corn starch to give a weight of 2.5 grains per tablet. The product is compressed on a single punch or rotary machine using a 9/32 inch punch.

EXAMPLE III

*500 mg. tablets.*—500 mg. of the hydrochloride of the compound in finely powdered form is admixed with 60 mg. of corn starch and 100 mg. of powdered sugar and then granulated with 10% gelatin solution. The granulation is dried and ground to size suitable for tableting. About 1% magnesium stearate is added as a lubricant, together with sufficient corn starch to give a weight of 700 mg. per tablet. The product is compressed on a single punch or rotary machine using a 7/16 punch.

The tablets of Example II and Example III may be suitably coated if desired, as, for example, with sugar.

EXAMPLE IV

*Liquid (syrup) 25 mg. per teaspoon.*—25 mg. of the acetate of the compound is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor as desired and water q. s. 5 ml. are then added.

EXAMPLE V

*Liquid (syrup) 500 mg. per tablespoon.*—500 mg. of the acetate of the new compound and 4.5 mg. of sugar are dissolved in sufficient water so that after the addition of 2.25 ml. of alcohol USP and flavor, as desired, the volume is 15 ml.

EXAMPLE VI

*Capsule.*—25 mg. of the hydrochloride of the compound is admixed with corn starch in quantity required to provide sufficient bulk for the desired size capsule, and the mixture is encapsulated.

EXAMPLE VII

*Capsule.*—500 mg. of the hydrochloride of the compound is admixed with sufficient corn starch to give the proper bulk for the desired size capsule, and the mixture is encapsulated.

EXAMPLE VIII

*Injectable solution, 25 mg. per ml.*—25 mg. of the acetate of the new compound and water for injection q. s. 1 ml. are mixed and warmed gently until solution is accomplished. The solution is filtered through fine sintered glass, filled into sterile 1 ml. ampules, and sterilized at 250° F. for 30 minutes.

EXAMPLE IX

*Injectable suspension, 100 mg. per ml.*—The following ingredients are sterilized separately: 100 mg. of the acetate of the compound, 0.1 mg. of Tween 80 and q. s. corn oil to make a final volume of 1 ml. These ingredients are admixed aseptically. Particle size may be achieved by use of micronized material or by use of a ball mill, maintaining aseptic conditions. The above suspension may be administered subcutaneously and intramuscularly.

EXAMPLE X

*Oral suspension, 25 mg. per 5 ml.*—150 mg. of Veegum H. V. is hydrated in about 3 ml. of water. 250 mg. of Tween 80, 25 mg. of the acetate of the compound, color and flavor as desired q. s. 5 ml. are added; the product is mixed well and homogenized.

EXAMPLE XI

*Oral suspension, 700 mg. per 15 ml.*—150 mg. of Veegum H. V. is hydrated in about 9 ml. of water; 500 mg. of Tween 80, 700 mg. of the acetate of the compound, color and flavor, as desired, and water q. s. 15 ml. are added; the product is mixed well and homogenized.

EXAMPLE XII

*1% ointment.*—To a melt of 1.5 lbs. of propylene glycol, 6.68 lbs. of polyethyleneglycol 400 USP and 6.68 lbs. of carbowax 4000 USP is added 0.15 lbs of micropulverized hydrochloride salt of the compound. The product is stirred until almost solid and milled if necessary to a smooth ointment. Fill in suitable containers.

EXAMPLE XIII

*10% ointment.*—To a melt of 1.5 lbs. of propylene glycol, 6 lbs. of polyethylene glycol 400 USP and 6 lbs. carbowax 4000 USP is added 1.5 lbs. of micropulverized hydrochloride of the compound. The product is stirred until almost solid and milled if necessary to a smooth ointment. Fill in suitable containers.

We claim:

1. 1,1-di-(p-chlorophenyl)-2-(2-piperidyl)-ethylene of the formula

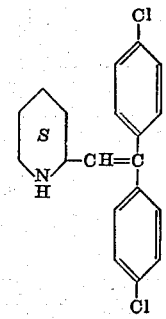

wherein S signifies that the ring is saturated.

2. A pharmaceutical preparation which includes a pharmaceutical carrier and 1,1-di-(p-chlorophenyl)-2-(2-piperidyl)-ethylene of the formula

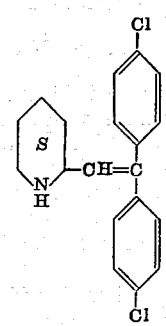

wherein S signifies that the ring is saturated.

No references cited.